United States Patent [19]

Dresti et al.

[11] Patent Number: 4,678,885

[45] Date of Patent: Jul. 7, 1987

[54] POWER SUPPLY CIRCUIT FOR SPARK EROSION

[75] Inventors: Silvano Dresti, Cannobio, Italy; Ernst Buhler; Rene Derighetti, both of Losone, Switzerland

[73] Assignee: AG fur industrielle Elektronik AGIE Losone b. Locarno, Losone, Switzerland

[21] Appl. No.: 733,006

[22] Filed: May 10, 1985

[30] Foreign Application Priority Data

May 11, 1984 [CH] Switzerland ............... 2353/84

[51] Int. Cl.⁴ ................... B23H 1/02; G05F 1/44
[52] U.S. Cl. .................... 219/69 C; 323/272
[58] Field of Search .............. 219/69 C, 69 P, 69 S

[56] References Cited

U.S. PATENT DOCUMENTS

| | | | |
|---|---|---|---|
| 3,052,817 | 9/1962 | Branker | 219/69 C |
| 3,517,154 | 6/1970 | Scarpelli et al. | 219/69 P |
| 4,163,887 | 8/1979 | Buhler et al. | 219/69 W |
| 4,277,668 | 7/1981 | Inoue | 219/69 M |
| 4,350,863 | 9/1982 | Inoue | 219/69 C |
| 4,357,516 | 11/1982 | Inoue | 219/69 P |
| 4,453,069 | 6/1984 | Inoue | 219/69 P |
| 4,516,009 | 5/1985 | Inoue | 219/69 P |

FOREIGN PATENT DOCUMENTS

| | | |
|---|---|---|
| 2908696 | 3/1979 | Fed. Rep. of Germany . |
| 1354354 | 2/1963 | France ............ 219/69 C |
| 1446961 | 9/1965 | France ............ 219/69 C |
| 149180 | 7/1981 | German Democratic Rep. ... 219/69 P |
| 150168 | 8/1981 | German Democratic Rep. ... 219/69 C |
| 44-17119 | 7/1969 | Japan ............ 219/69 P |
| 348317 | 9/1972 | Japan ............ 219/69 C |
| 352734 | 10/1972 | Japan ............ 219/69 P |
| 55-5230 | 1/1980 | Japan ............ 219/69 P |
| 184631 | 11/1982 | Japan ............ 219/69 C |
| 85/00311 | 1/1985 | PCT Int'l. Appl. ............ 219/69 C |
| 574297 | 9/1977 | U.S.S.R. ............ 219/69 C |
| 810421 | 3/1981 | U.S.S.R. ............ 219/69 P |
| 1038163 | 8/1983 | U.S.S.R. ............ 219/69 P |

Primary Examiner—A. D. Pellinen
Assistant Examiner—Geoffrey S. Evans
Attorney, Agent, or Firm—Neuman, Williams, Anderson & Olson

[57] ABSTRACT

A circuit arrangement for producing machining pulses in a spark erosion installation from a direct current power source that functions without the use of ballast resistors. There are at least two controllable circuits which are parallel to the spark gap and to one another and whose output currents are additively superimposed for a total current flowing through the spark gap. The control inputs of the circuits are connected to a control circuit, which produces time-associated control signals, the nature of the time circuit cooperates with the control elements of the circuits, so that a current pulse is only allowed to pass to the spark gap if the switches controlled by the control elements are simultaneously open.

6 Claims, 7 Drawing Figures

POWER SUPPLY CIRCUIT FOR SPARK EROSION

BACKGROUND OF THE INVENTION

The effectiveness of the discharges in the working gap of a spark erosion plant and, consequently, the design of the spark generator play a decisive part in the economic operation of the spark erosion process. Previously, pulse generators have been used which provide a current limitation by the use of ballast resistors to protect the power supply against excessive current loads during a discharge in the working gap. The ballast resistors are also intended to protect the semiconductor switches. However, it was recognized that ballast resistors are prejudicial to the desirable power increase of the generator.

DE-OS No. 2,908,696 proposes providing a spark erosion generator without ballast resistors, in which the positive high frequency half-waves of the generator circuit are supplied to the spark gap with timed interruption. However, this approach leads to undesirably high-ripple discharge pulses with short interruptions of the power supply. The interruptions may be so short that all pulses lead to a discharge in the same discharge channel However, this condition makes control of the spark erosion installation less flexible rather than permitting a broad variation of the different process parameters.

SUMMARY OF THE INVENTION

The problem addressed by the present invention is to improve the control possibilities in a spark generator circuit arrangement. According to the invention, a spark generator is provided that operates without significant ballast resistors. The spark generator preferably includes a number of individual switching circuits connected in parallel with each other, and a power supply. Each circuit includes a switching means, such as switching transistors, and a pulse transformer. The primary winding of the pulse transformer is preferably connected in series between two switching transistors; the secondary winding of the pulse transformer is connected in parallel with the spark gap for delivering the machining pulse to the gap. The switching circuit is controlled by a control device that selectively turns on the switching transistors—both transistors need to be turned on for the switching ciruit to generate a machining pulse.

A further control device may be provided in the form of a current sensor that measures the current in the switching circuit and disables at least one of the switching transistors when the current in the switching circuit reaches a predetermined level. Diodes may be connected across the primary winding and each of the switching transistors so that the pulse transformer is in a freewheeling state if the associated transistor should be the only transistor turned on at a particular time. The control device, which is preferably a logic circuit, selectively energizes the switching circuits in accordance with a predetermined firing pattern.

This leads to the decisive advantage of increased generator efficiency with great flexibility of control as a function of a wide variety of preselectable process parameters. In addition, only modest manufacturing expenditure is required. The current amplitudes and clock timings are freely controllable independently of fluctuations in the supply network. With the aid of a freely settable residual ripple on the discharge current, the roughness of the workpiece surface to be worked can be varied in an advantageous manner. Finally, the circuit arrangement according to the invention permits an isolation between the network and the spark gap.

BRIEF DESCRIPTION OF THE DRAWINGS

The invention is described in greater detail hereinafter relative to illustrative embodiments and the attached drawings, which show.

DETAILED DESCRIPTION OF THE PREFERRED EMBODIMENTS

Figure 1:
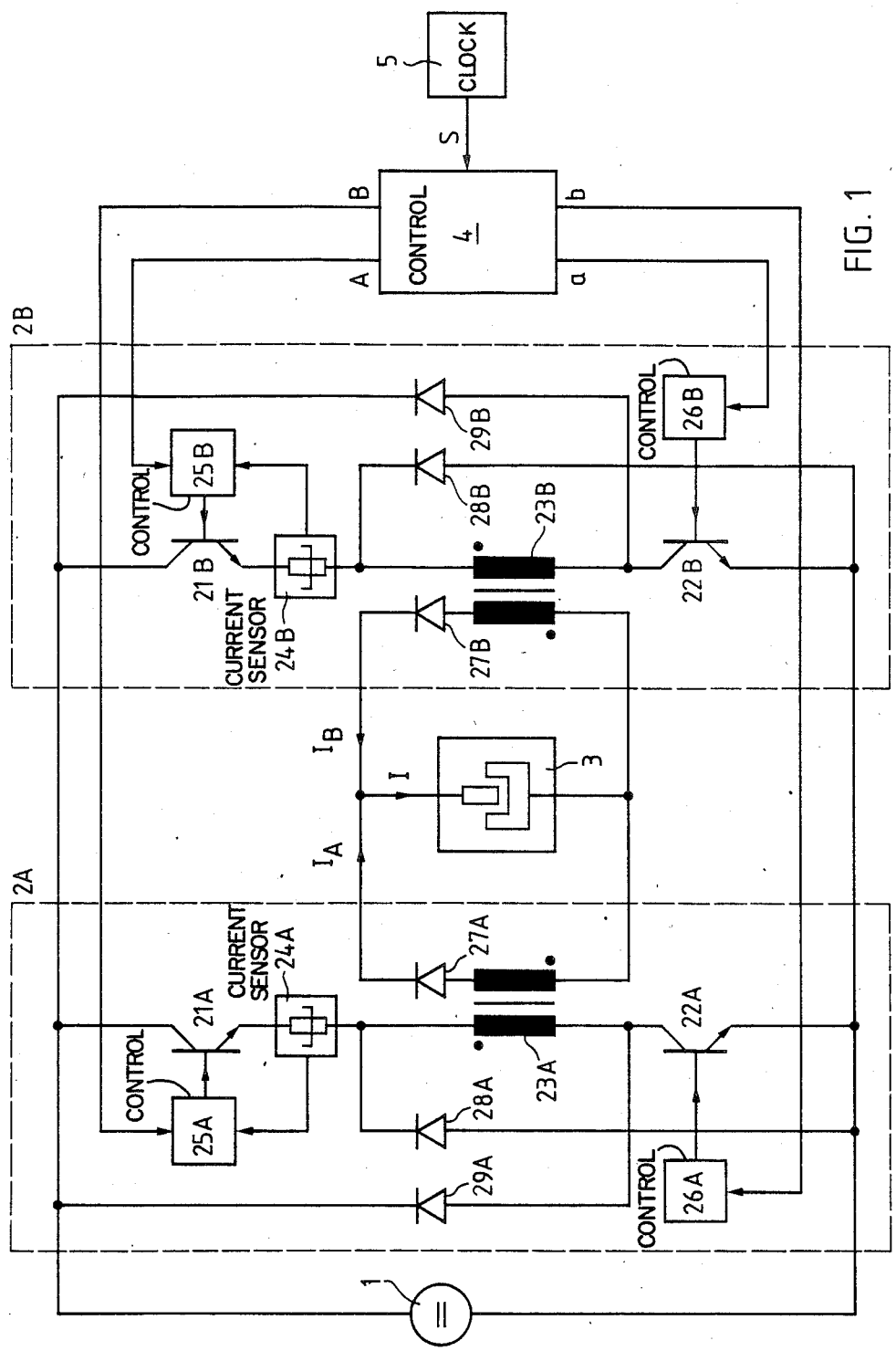
FIG. 1: a preferred embodiment with two controllable spark erosion circuits.

The generator diagram shown in FIG. 1 has a power supply 1 from which a spark gap 3 is supplied by two parallel, non-dissipative circuits or circuit branches 2a and 2b, so that the current I through the spark gap 3 results from the sum of the component currents $I_A$ and $I_B$. The represented basic circuit principle can be duplicated many times in the same way. In order to produce switching signals for switches 21A, 22A, 21B, 22B or switching branches 2A and 2B, a control circuit 4 is provided, which contains a logic circuit for producing control signals A,a,B,b, in accordance with the requirements of switching branches 2A, 2B. This control circuit is clocked from a clock generator 5 by a clock signal S, so that the on-off signal for the generator pulses can be selectively given by the machine operator.

The elements of switching branch 2A are designated by index A and those of switching branch 2B by index B. In the represented embodiment, switching branches 2A, 2B have an identical construction. In the following description of switching branches 2A, 2B, there is consequently no need to refer to the aforementioned indexing.

Each switching branch 2 has two controlled switches 21, 22 which, in the conductive state, release a current through the primary winding of a pulse transformer 23. The current intensity is determined in a current measuring member 24 and in the first control stage 25 is adjusted to a desired value set there. For this purpose, the actual value signal from the current measuring member 24 is measured against a given desired value stored in control stage 25. As soon as the actual value signal has reached the desired value signal, control stage 25 switches the switch 21 into the non-conductive state. Pulse transformer 23 is operated below its saturation, so that all the current pulses passed through the primary side produce the component currents $I_A$, $I_B$ on the secondary side with a current intensity corresponding the transmission ratio. These component currents are kept unidirectional by means of the diodes 27.

The control of switches 21, 22, which are preferably in the form of transistors, takes place from control circuit 4 with the aid of the logic or control signals A,a or B,b allocated to switches 21, 22 by the first control stage 25 or a second control stage 26. It is pointed out that switches 21, 22 in switching branches 2 are blocked if control signal A,a,B,b is at logic 1 and switched if said control signal is at logic 0. Only if the two switches 21, 22 are simultaneously open is a current pulse transmitted to the spark gap 3. However, if only one of the switches 21 or 22 is switched on, then by means of diodes 28 or 29, the primary side of the pulse transformer 23 is always in a "freewheeling" circuit.

For this purpose, the primary side of pulse transformer 23 is in series between the two switches 21, 22. In addition, diode 29 is connected in parallel to the switching branch comprising switch 21 and the primary side of pulse transformer 23, and diode 28 is connected in parallel to the switching branch comprising the primary side of pulse transformer 23 and switch 22.

The reliable ignition of the discharge by spark gap 3 is brought about by the high induced voltage resulting from the pulse transmission. The circuit diagram shows that the spark gap 3 is completely directly disconnected from the generator circuit and can consequently be operated in random polarity.

Figure 2:
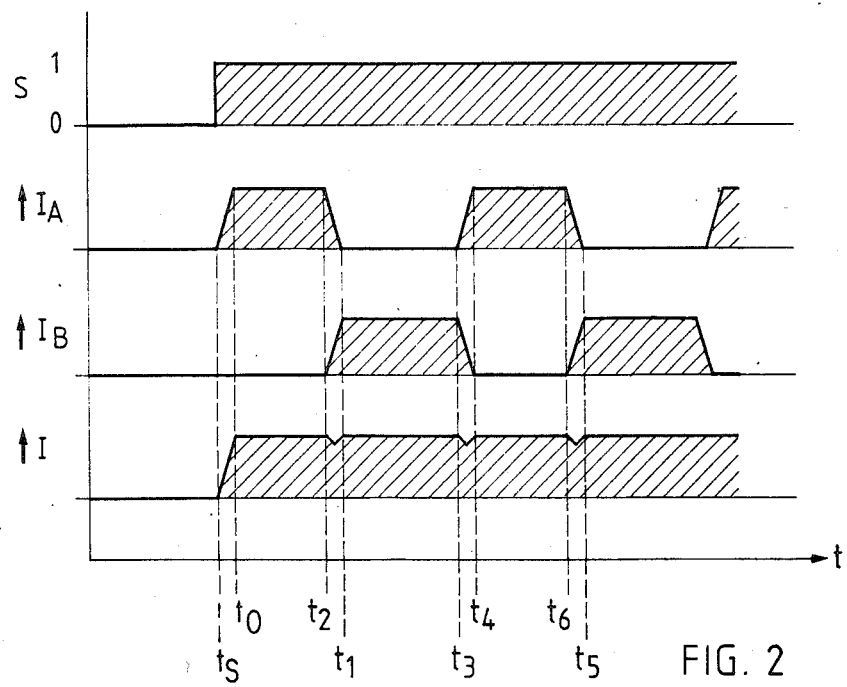
FIG. 2: a timing diagram representing the current superposition in the generator according to FIG. 1.

FIG. 2 shows the total current I resulting from the superimposing of the two component currents $I_A$ and $I_B$ in the case of synchronized driving of the two switching branches 2A, 2B by control circuit 4. At time $t_s$, the operator-controlled timing generator 5 switches on timing signal S, so that intially both switches 21A, 22A are switched on in the first switching branch 2A, so that a current pulse is released in transformer 23A. As will be explained in greater detail hereinafter relative to control circuit 4 (FIG. 4), this current pulse is set to a time length ($t_2-t_0$) such that it can be technically and thermally coped with by the components used. The time lag of $t_0$ compared with $t_s$, as is known, results from the response delay typical for power switching circuits. Switching branch 2A is then switched off. However, in parallel, the second switching branch 2B is fired in time advance, so that component current $I_B$ starts to flow therein at time $t_1$. Bearing in mind the thermal and technical capability of the circuit, it is only left switched on for a time ($t_4-t_1$). At time $t_3$ and with time advance, the first switching branch 2A has again switched on, and so on. The third indicated current I results from the summing of component currents $I_A$ and $I_B$ and is produced in alternating manner by the parallel switching branches 2A, 2B while the timing signal S is high. Through the control of the advance firing of the following pulse and the same pause and pulse widths, it is possible to fire a virtually randomly additively shaped current pulse of infinite duration. The shortest possible current duration is the time achieved by a single switching path 2 for the rising and falling edges of a current flow. Using commercially available components, this can be achieved with the order of magnitude of microseconds. The slight breakdowns shown for current I between times $t_1/t_2$; $t_3/t_4$; $t_5/t_6$ in FIG. 2 show that a planned shaping of the discharge current pulses is possible through superimposing the pulses.

Figure 3:
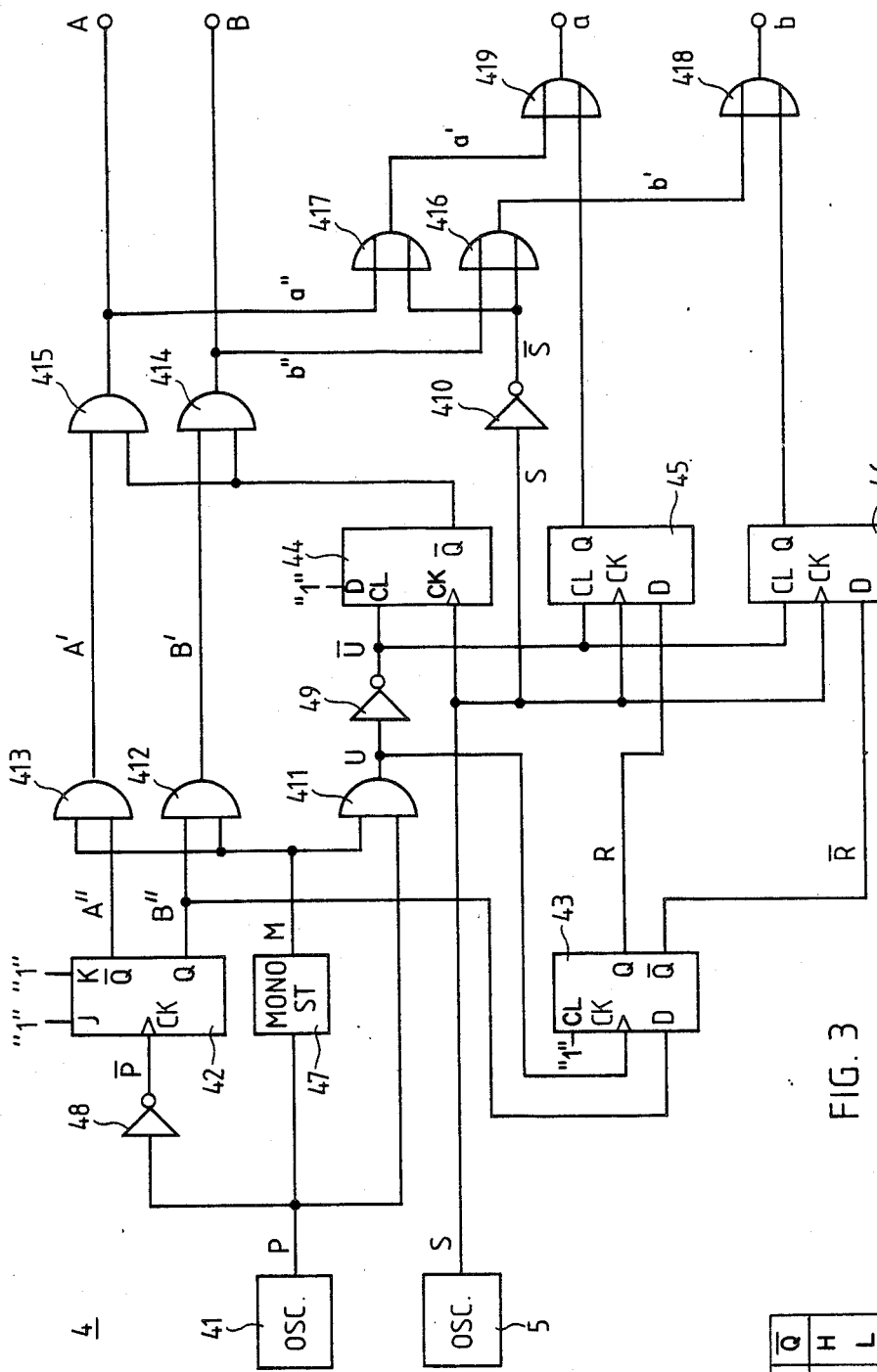
FIG. 3: a control circuit for controlling the two circuits shown in FIG. 1.

FIG. 3 shows the circuit diagram for the control circuit 4 for producing control signals A, a, B, b, which are associated with one another by means of a switching logic. Apart from the timing generator 4 being constructed as an oscillator to which is supplied the desired processing rate for the discharge pulses by the machine operator by the timing signal S, the control circuit 4 has a further oscillator 41, which generates a high frequency pulse signal P of preferably square-wave pulses. After inverting to $\overline{P}$ by inverter 48, this pulse signal $\overline{P}$ is supplied to the timing input CK of a J-K flip-flop 42, whose inputs J and K are set at logic 1. Signals A″ and B″ are obtained at the outputs $\overline{Q}$ and $\overline{Q}$ of said master flip-flop 42 and are converted by first AND elements 413 or 412 into signals A′ and B′ and then by second AND elements 415, 414 into signals A and B. The group of first AND elements 412, 413 only permit the passage of signals A″, B″ if simultaneously a signal M supplied thereto is at logic 1. Signal M is supplied by the output of a monostable device 47, to whose control input is supplied pulse signal P. Monostable device 47 toggles from its stable into its instable state at the positive edge of a pulse signal P. Thus, the monostable device 47 produces the non-uniformity of the off intervals with repect to the on intervals shown in FIG. 2 in connection with the time advance for igniting a subsequent pulse.

The group of second AND elements 414, 415 only allows signals A′, B′ to pass if the output signal at output $\overline{Q}$ of a D-flip-flop 44 is at logic 1. Timing signal S is supplied to the timing input CK of flip-flop 44, whereas a signal $\overline{U}$ is supplied to the clear input CL. Signal $\overline{U}$ is the output signal of an inverter 49 which, on the input side is connected to the output of an AND element 411, to whose input is applied the pulse signal P and signal M. On the output side, it supplies a signal U to inverter 49. The D-input of this flip-flop 44 is kept permanently at logic 1. The possible states of this D-flip-flop 44 which are of interest here result from the truth table also shown in FIG. 3 and in which the following meanings are used:

CL: clear input
D: D-input
CK: timing input
Q-output
$\overline{Q}$:$\overline{Q}$-output
L: logic 0
H: logic 1
$Q_0,\overline{Q}_0$:randomly presettable level
X: random level ↑:rising edge.

The falling edge of signal M is used for controlling the aforementioned time advance of the ignition of subsequent pulses.

Signals a and b are derived from signals A and B. For this purpose, output signal A of AND element 415 or output signal B of AND element 414 are supplied as signals a″ or b″ to one input of a first OR element 417 or 416. Thus, signals and a″ and b″ are identical to signals A and B. The timing signal S, inverted by an inverter 410 to signal $\overline{S}$, is supplied as the alternative signal to the two OR elements 416, 417. On the output side, OR elements 416, 417 supply signals a′ and b′, which remain at logic 1 for as long as timing signal S is at logic 0. However, if timing signal S is also logic 1, then signals a′ and b′ correspond to signals a″ and b″ and consequently to signals A and B.

Signals A and B can only be present in an alternating manner controlled by the master flip-flop 42. The period of time between the falling edge of signal A and the rising edge of signal B and vice versa is equal to the time during which signal M is at logic 0. It must also be remembered in connection with signals A and B that they can only be at logic 0 if signal S is at logic 1. It should also be noted that at the positive edge of timing signal S, there is a forced synchronization to the remaining signals, particularly signals M and U.

For this purpose, a further OR element 418 is connected downstreanm of the OR element 416 and on one input thereof acts signal b′. The same applies with respect to an OR element 419 connected downstream of OR element 417 and to whose one input is applied signal a′. To the alternative input of OR element 418 is applied the Q-signal of an upstream-connected D-flip-flop 46 and to the alternative input of OR element 419 is applied the Q-signal of a D-flip-flop 45. OR elements 418, 419 supply signals a and b. A further D-flip-flop 43 is positioned upstream of the two D-flip-flops 45, 46. The clear input CL of D-flip-flop 43 is permanently held at logic 1. Flip-flops 43, 45 and 46 also satisy the truth table given in FIG. 3. Output signal U of AND element 411 is applied to the timing input CK of flip-flop 43, while output signal B" of master flip-flop 42 is applied to the D-input. Signal R supplied by the Q-output of flip-flop 43 is supplied to the D-input of flip-flop 45. Signal $\overline{R}$ supplied by the $\overline{Q}$ output of the flip-flop 43 is supplied to the D-input of flip-flop 46. Timing signal S is applied to the timing input CK of flip-flops 45, 46 and the output signal $\overline{U}$ of inverter 49 is supplied to the clear inputs CL. By driving the D-input of flip-flop 43 with output signal B" of the master flip-flop 42 and the timing input CK with the output signal U of the AND element 411, it is achieved that also on changing timing signal S from logic 0 to logic 1, the desired forced synchronization is maintained between the alternating course of signals A and B and signals a and b. In addition, the switching sequences for signals A and B and a and b, and the resulting currents $I_A$ and $I_B$ as a function of the different signals within circuit 4, are made clearer in FIGS. 4a to 4d.

Figure 4A:
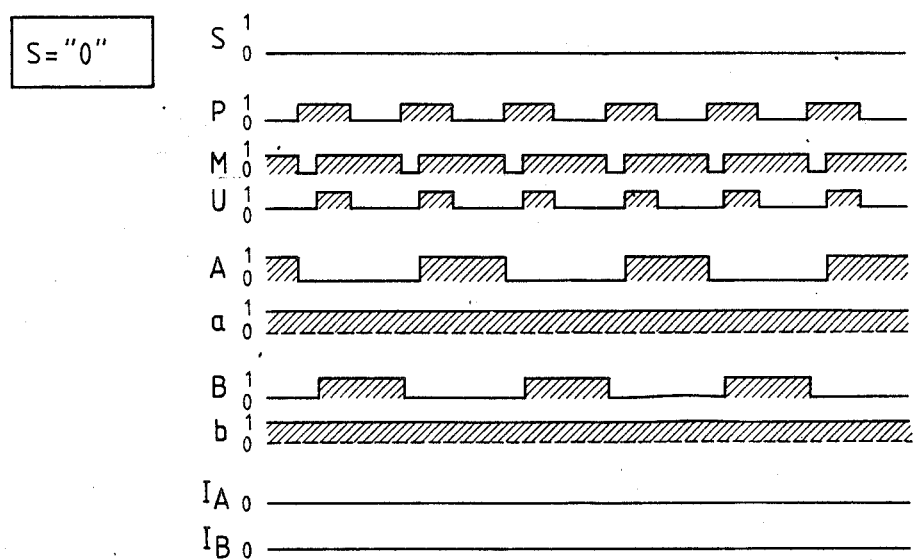
FIGS. 4a to 4d: timing diagrams for illustrating the operating procedure of the preferred embodiment.

FIG. 4a assumes the case in which the eroding machine is under stand-by conditions, i.e. is not eroding. Thus, timing signal S of timing generator 5 is at logic 0, so that as a result of the inversion in inverter 410, output signals a' and b' of OR elements 416, 417 and consequently output signals a, b of OR elements 418, 419 are permanently at logic 1. Thus, in switching branches 2A, 2B, no current $I_A$, $I_B$ flows through the pulse transformers 23a, 23b, i.e. spark gap 3 remains without current pulses. Signals M and U are derived from the pulse signal P and namely across the one-shot multivibrator 47 (signal M) and the AND element 411 (signal U).

In the case assumed in FIG. 4a, signal A" is mirror symmetrical to signal B" and signal A' coincides with signals A and A". The same applies with regard to the relationship between signals B, B' and B". In addition, signals a and a', as well as b and b' correspond to one another.

Figure 4B:
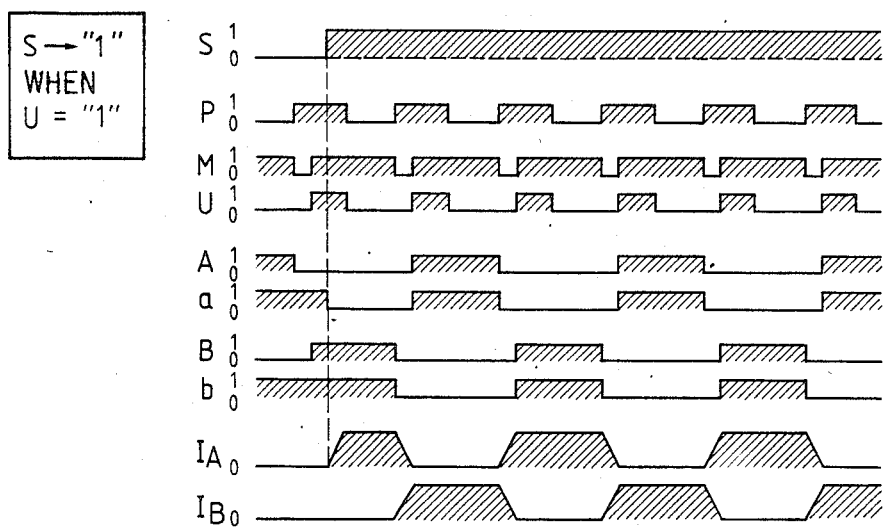

In FIG. 4b, it is assumed that the eroding machine is put into operation, i.e. timing signal S is set to logic 1. In the case assumed in FIG. 4b, this is to take place within a data window in which signal U is also at logic 1. From the timing standpoint, signal U largely corresponds to the pulse signal P of oscillator 41, but is reduced by the settable advance time for the overlap of the pulses, which is the same as the period of time during which the output signal M in the one-shot multivibrator 47 is at logic 0. FIG. 4b shows that at the time of setting timing signal S to logic 1 at U=1, the output signal a of the OR element 419 changes directly from logic 1 to logic 0. As a result, in the represented example, a current starts to flow through switching branch 2A and a corresponding component current $I_A$ is induced in spark gap 3, once again with the lag given by the power switching circuit used. The further switching signal sequence takes place with the rhythm already described relative to FIG. 4a, for as long as the timing signal S exists. Thus, the relationships between the switching signals illustrated in FIG. 4a still apply, but with the difference that a varies synchronously with A, and b varies synchronously with B.

Figure 4C:
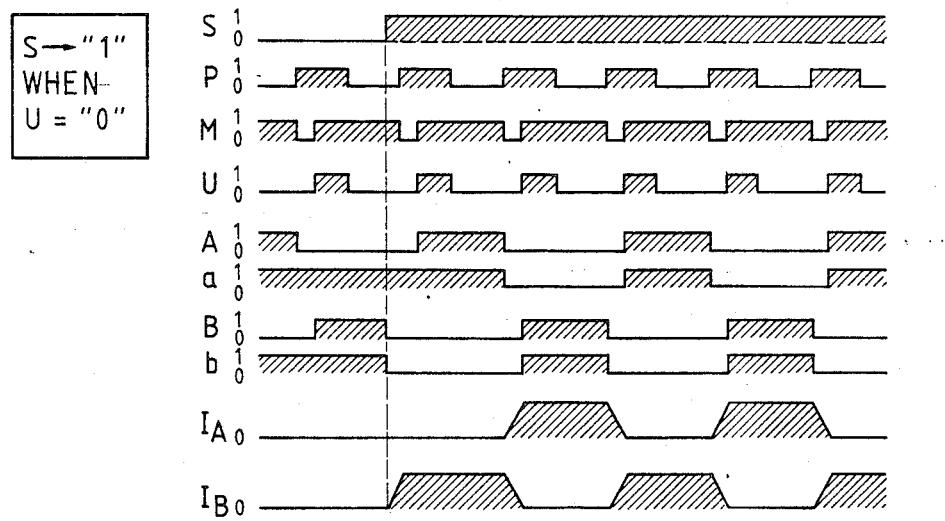

Compared with FIG. 4b, FIG. 4c considers the alternative possibility of signal S being set at logic 1, when signal U is at logic 0. In this case, through control circuit 4 and due to flip-flop 44, output signal B of AND element 414 is directly set to logic 0. The output signal of flip-flop 46 is also directly set to 0 so that output signal b of OR element 418 is also set to logic 0. As a result, the component current $I_B$ flows through transformer 23B and releases a corresponding pulse in spark gap 3. Due to the activation of the OR element 419 with the signal of the Q-output of flip-flop 45, signal a remains at 1 and consequently blocks the associated switch in circuit 2A. After this, the signals again assume the rhythm shown in FIG. 4b.

Figure 4D:
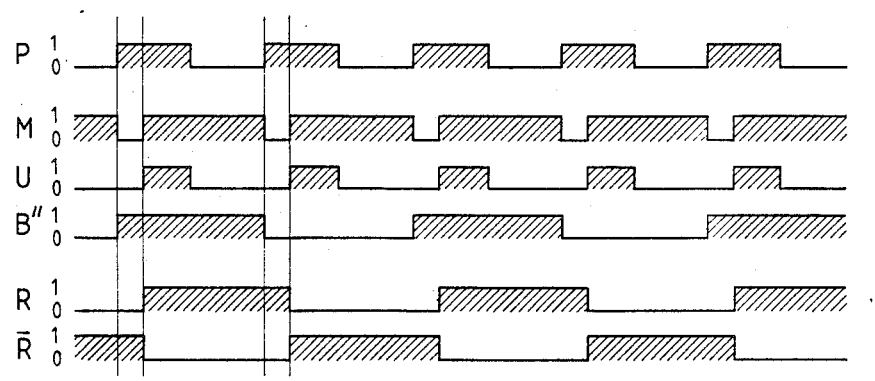

FIG. 4d also shows the relationship between signals B", R and R, as a function of the pulse signal P, as well as signals M and U. It is noteworthy that signal R and therefore also signal $\overline{R}$, is displaced by a constant with respect to signal B" on the time axis and this is equal to the duration of signal M on logic 0.

The control circuit 4 described relative to FIGS. 3 and 4a to d can also be duplicated and connected in parallel, so that it is possible to produce variable pulse shapes with variable amplitude. This is achieved by a suitable choice of the overlap of the pulses supplied by the individual control circuits, as well as by a suitable choice of pause intervals between the pulses. Timing generator 5 assumes responsibility for the synchronous control of all the participating control circuits 4. The parallel branches of control circuits 4 can also be purely additively interconnected for increasing the current, in order to produce particularly strong pulses.

What is claimed is:

1. A spark generator for the machining of an electrically conductive workpiece in a spark erosion plant across a spark gap formed between the workpiece and a tool electrode with substantially no ballast resistance, comprising a direct current power supply; at least one switching circuit connected in parallel with the power supply; and a control device connected to each switching circuit; each switching circuit comprising first and second switching elements, each switching element having a conductive and a nonconductive state; a pulse transformer having a primary and secondary winding, the switching elements and the primary winding being connected in series circuit so that current from the power supply is applied to the primary winding when the switching elements are placed in the conductive state, and the secondary winding being connected in parallel with the spark gap; and a unidirectional current conducting means associated with each switching element and operatively connected across the primary winding and the associated switching element to place the pulse transformer in a freewheeling state when only the associated switching element of the first and second switching elements is in the conductive state; the control device being operatively connected to each switching element and adapted to selectively place each switching element in the conductive state in accordance with a predetermined pattern.

2. A spark generator in accordance with claim 1 wherein the switching elements of each switching circuit are connected to opposite sides of the primary winding and the unidirectional current conducting elements are connected in parallel across its associated switching element and the primary winding.

3. A spark generator in accordance with claim 1 in which each switching circuit further includes a means to sense the current flow through the primary winding, the current sensing means being connected to at least one of the switching elements and adapted to place at least one switching element in a nonconductive state when the sensed current reaches a predetermined level.

4. A spark generator in accordance with claim 1, further comprising a clock means connected to the control device for supplying clock pulses at a predetermined frequency, and wherein the predetermined pattern is provided by a logic means in the control device on the basis of the supplied clock pulses.

5. A spark generator in accordance with claim 4 wherein the logic means includes an oscillator for providing a pulse signal train having a frequency different than that of the clock means, for timing control within the logic means.

6. A spark generator in accordance with claim 5 wherein the frequency of the oscillator is greater than that of the clock means and the logic means further comprises:
- an input for receiving clock pulses from the clock means;
- a first inverter, a monostable device and a first AND element which receive as inputs the output of the oscillator;
- second and third AND elements having a connection to the outputs of a master J-K flip-flop which receives as a input the output of the inverter, the second input of each of the second and third AND elements being the output of the monostable device;
- a first D flip-flop having inputs from the output of the first AND element and one of the outputs of the master flip-flop;
- a second D flip-flop connected to the output of the first AND element through a second inverter;
- third and fourth D flip-flops having inputs from the second inverter, the input for receiving clock pulses, and separate outputs of the first D flip-flop;
- fourth and fifth AND elements having inputs from the second D flip-flop and separate outputs of the second and third AND elements, the outputs of the fourth and fifth AND elements being the control signals to selectively place in the conductive state one of the two switching elements of each of two switching circuits;
- first and second OR elements having as inputs the inverted input for receiving clock pulses and separate outputs of the fourth and fifth AND elements; and
- third and fourth OR elements having as inputs separate outputs of the third and fourth D flip-flops and separate outputs of the first and second OR elements, the outputs of the third and fourth OR elements being the control signals to selectively place in the conductive state the other of the two switching elements of each of the two switching circuits.

* * * * *